(12) United States Patent
Kruckenberg

(10) Patent No.: US 11,850,831 B2
(45) Date of Patent: Dec. 26, 2023

(54) COMPONENT WITH BONDED THERMOPLASTIC AND THERMOSET LAYERS

(71) Applicant: Rohr, Inc., Chula Vista, CA (US)

(72) Inventor: Teresa Kruckenberg, La Mesa, CA (US)

(73) Assignee: ROHR, INC., Chula Vista, CA (US)

( * ) Notice: Subject to any disclaimer, the term of this patent is extended or adjusted under 35 U.S.C. 154(b) by 64 days.

(21) Appl. No.: 17/716,510

(22) Filed: Apr. 8, 2022

(65) Prior Publication Data
US 2022/0227111 A1    Jul. 21, 2022

Related U.S. Application Data

(62) Division of application No. 16/131,939, filed on Sep. 14, 2018, now Pat. No. 11,298,924.

(51) Int. Cl.
| | |
|---|---|
| *B32B 27/12* | (2006.01) |
| *B29C 70/02* | (2006.01) |
| *B32B 5/02* | (2006.01) |
| *B32B 27/20* | (2006.01) |
| *B32B 27/30* | (2006.01) |
| *B32B 27/34* | (2006.01) |
| *B29L 31/30* | (2006.01) |

(52) U.S. Cl.
CPC ............ *B32B 27/12* (2013.01); *B29C 70/021* (2013.01); *B32B 5/028* (2013.01); *B32B 27/20* (2013.01); *B32B 27/304* (2013.01); *B32B 27/34* (2013.01); *B29L 2031/3076* (2013.01); *B32B 2262/101* (2013.01); *B32B 2262/106* (2013.01); *B32B 2264/0228* (2013.01); *B32B 2264/108* (2013.01); *B32B 2605/18* (2013.01)

(58) Field of Classification Search
None
See application file for complete search history.

(56) References Cited

U.S. PATENT DOCUMENTS

| | | | |
|---|---|---|---|
| 5,643,390 | A | 7/1997 | Don |
| 6,565,942 | B2 | 5/2003 | Anderson |
| 8,197,624 | B2 | 6/2012 | Beehag |
| 8,790,486 | B2 | 7/2014 | Hou |
| 8,962,130 | B2 | 2/2015 | Kruckenberg |
| 9,511,562 | B2 | 12/2016 | Kruckenberg |
| 2002/0187702 | A1 | 12/2002 | Delusky |
| 2004/0067705 | A1 | 4/2004 | Ton-That |
| 2004/0231790 | A1 | 11/2004 | Hou |
| 2009/0227162 | A1 | 9/2009 | Kruckenberg |
| 2010/0305274 | A1 | 12/2010 | Bonneau |
| 2015/0298388 | A1 | 10/2015 | Wong |

OTHER PUBLICATIONS

EP Office Action for EP19197401.3 dated May 6, 2022.

*Primary Examiner* — Samir Shah
(74) *Attorney, Agent, or Firm* — GETZ BALICH LLC

(57) ABSTRACT

A component is provided that includes a multi-layer body configured with a thermoplastic layer, a thermoset layer and a scrim at an interface between the thermoplastic layer and the thermoset layer. The thermoplastic layer includes a plurality of reinforcement particles within a thermoplastic matrix. The thermoset layer is configured from or otherwise includes a thermoset matrix.

15 Claims, 5 Drawing Sheets

COMPONENT WITH BONDED THERMOPLASTIC AND THERMOSET LAYERS

This application is a divisional of U.S. patent application Ser. No. 16/131,939 filed Sep. 14, 2018 which is hereby incorporated herein by reference.

BACKGROUND

1. Technical Field

This disclosure relates generally to composite bodies and, more particularly, to polymer composite bodies and methods for forming such bodies.

2. Background Information

Various types and configurations of polymer composite bodies are known in the art. Such known composite bodies may include only thermoplastic resins, only thermoset resins or a combination of thermoplastic and thermoset resins. While these known composite bodies have various benefits, there is still room in the art for improvement.

SUMMARY OF THE DISCLOSURE

According to an aspect of the present disclosure, a component is provided that includes a multi-layer body configured with a thermoplastic layer, a thermoset layer and a scrim at an interface between the thermoplastic layer and the thermoset layer. The thermoplastic layer includes a plurality of reinforcement particles within a thermoplastic matrix. The thermoset layer is configured from or otherwise includes a thermoset matrix.

According to another aspect of the present disclosure, another component is provided that includes a multi-layer body configured with a thermoplastic layer, a thermoset layer and a scrim at an interface between the thermoplastic layer and the thermoset layer. The thermoplastic layer includes a plurality of thermoplastic particles within a thermoplastic matrix. A melting point of the thermoplastic matrix is less than a melting point of the plurality of thermoplastic particles. The thermoset layer includes fiber-reinforcement within a thermoset matrix. The scrim is configured from or otherwise includes fiber glass and/or carbon fiber.

According to still another aspect of the present disclosure, another component is provided for an aircraft. The component includes a skin and a thermoplastic structural support. The skin includes a thermoplastic layer, a thermoset layer and a scrim at an interface between the thermoplastic layer and the thermoset layer. The thermoplastic layer includes a plurality of particles within a thermoplastic matrix. The thermoset layer includes fiber-reinforcement within a thermoset matrix. The thermoset layer is configured to form an exterior flow surface of the component. The thermoplastic structural support is bonded to the thermoplastic layer. The thermoplastic structural support is configured to structurally reinforce the skin.

According to still another aspect of the present disclosure, a method is provided for forming a component. This method includes: providing a thermoplastic layer that includes a plurality of reinforcement particles within a thermoplastic matrix; providing a thermoset layer configured from or that otherwise includes a thermoset matrix; providing a scrim; and curing and consolidating the thermoplastic layer, the thermoset layer and the scrim together to form a multi-layer body. The multi-layer body is configured with the scrim at an interface between the thermoplastic layer and the thermoset layer.

The scrim may be embedded within the thermoplastic layer at the interface.

The scrim may be embedded within the thermoset layer at the interface.

The thermoplastic matrix may include polyvinylidene fluoride or nylon. The plurality of thermoplastic particles may include polyether ether ketone.

The component may include a thermoplastic structural support bonded to the thermoplastic layer. The multi-layer body may be configured as an exterior skin of the component that is supported by the thermoplastic structural support.

The thermoplastic matrix may be configured from or otherwise include polyvinylidene fluoride.

The thermoplastic matrix may be configured from or otherwise include nylon.

The plurality of reinforcement particles may be or otherwise include a plurality of thermoplastic particles. A melting point of the thermoplastic matrix may be less than a melting point of the plurality of thermoplastic particles.

The plurality of reinforcement particles may be or otherwise include a plurality of polyether ether ketone particles.

The thermoplastic layer may be about fifty percent by volume of the plurality of reinforcement particles and about fifty percent by volume of the thermoplastic matrix.

The plurality of reinforcement particles may be or may otherwise include a plurality of nano-particles.

The plurality of reinforcement particles may be or may otherwise include a plurality of micro-particles.

The thermoplastic layer may further include a plurality of carbon particles.

The thermoset layer may further include fiber-reinforcement material within the thermoset matrix.

The scrim may be configured from or otherwise include carbon fibers.

The scrim may be configured from or otherwise include glass fibers.

The scrim may be impregnated with the thermoplastic matrix.

The scrim may be impregnated with the thermoset matrix.

The thermoplastic matrix may be mixed with the thermoset matrix at the interface.

The component may also include a thermoplastic structural support bonded to the thermoplastic layer. The multi-layer body may include a skin that is supported by the thermoplastic structural support. The component may be configured as an aircraft component.

The foregoing features and the operation of the invention will become more apparent in light of the following description and the accompanying drawings.

DETAILED DESCRIPTION

Figure 1:
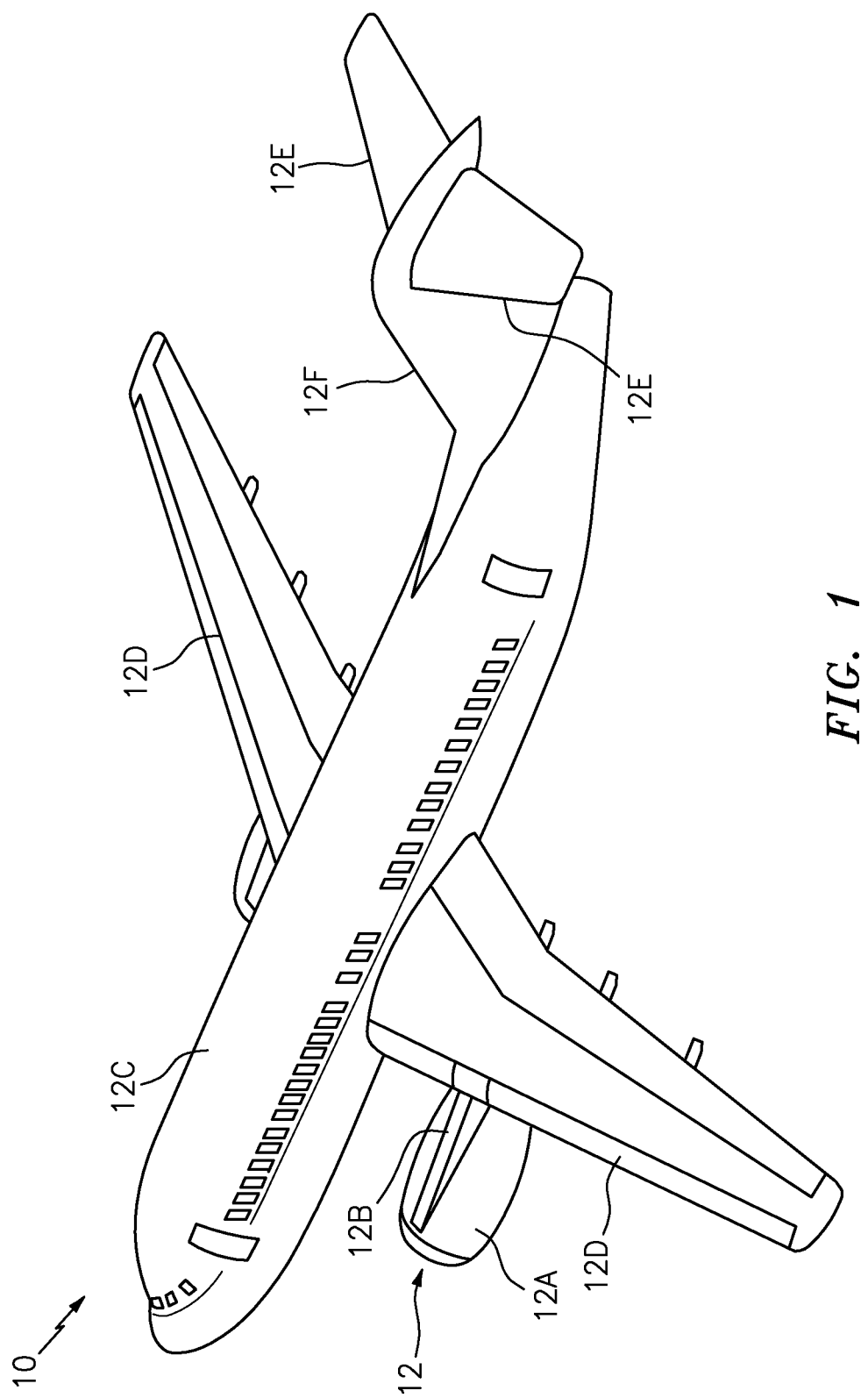
FIG. 1 is a perspective illustration of an aircraft, in accordance with various embodiments.

FIG. 1 is a perspective illustration of an exemplary aircraft 10 configured as a passenger airliner. This aircraft 10 includes various exterior components 12A-E (generally referred to as "12") configured with aerodynamic exterior flow surfaces. Examples of such components 12 include, but are not limited to, a nacelle 12A for an aircraft propulsion system 14 (e.g., a turbofan or turbojet engine system), a pylon 12B, a fuselage 12C and wings 12D-12E. Such components 12 may each include an exterior skin that is reinforced/supported by one or more internal structural supports; e.g., ribs, stiffeners, longerons, pedestals, structural cores, etc. The exterior skin may form the aerodynamic exterior flow surface of the component 12, which surface is directly exposed to air flowing along the component 12 during aircraft operation.

Figure 2:
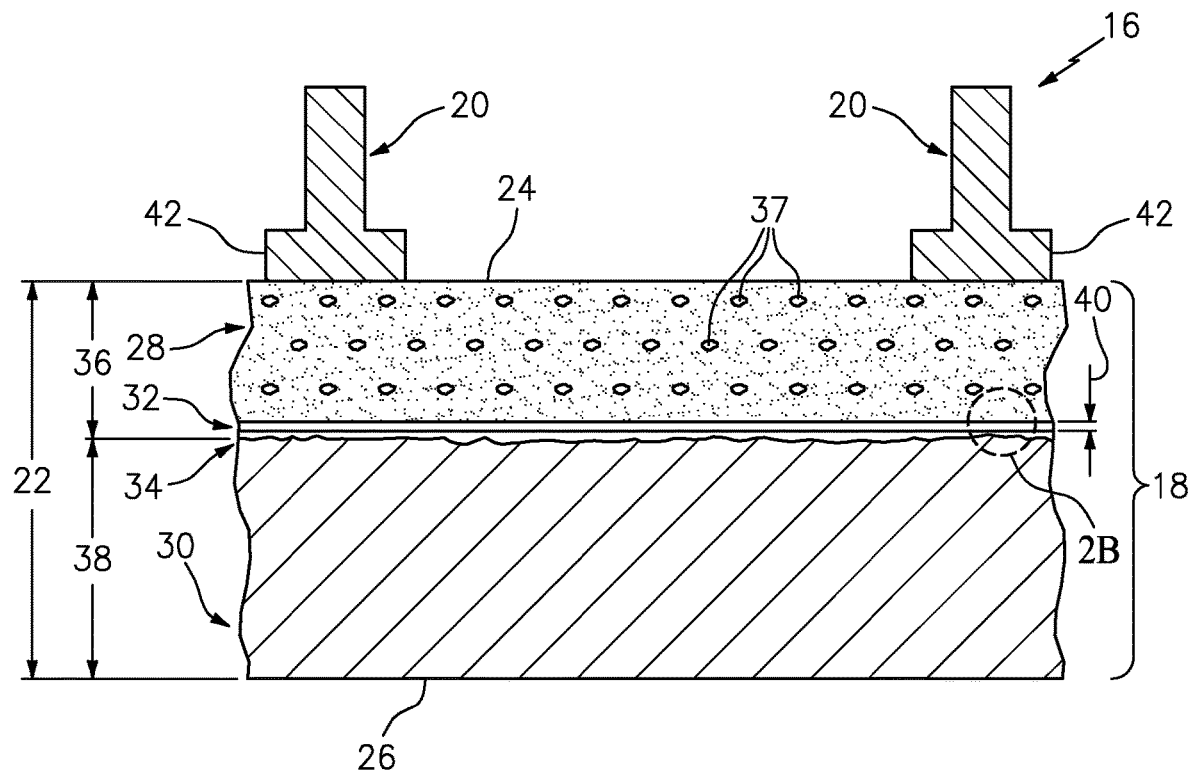
FIG. 2 is a sectional illustration of a thermoplastic-thermoset component, in accordance with various embodiments.

FIG. 2 a sectional illustration of a thermoplastic-thermoset component 16. This thermoplastic-thermoset component 16 may be configured as one of the exterior components 12 described above with reference to FIG. 1. The thermoplastic-thermoset component 16, however, is not limited to such exemplary exterior component configurations. The thermoplastic-thermoset component 16 is also not limited to exterior applications. For example, in other embodiments, the thermoplastic-thermoset component 16 may alternatively be configured as an interior component (e.g., a wall panel, a bifurcation panel, an inner fixed structure panel) of the aircraft 10. The present disclosure is also not limited to the exemplary aircraft configuration of FIG. 1. For example, in other embodiments, the aircraft 10 may alternatively be configured as a business-jet, a cargo plane, a propeller plane, a helicopter or any other type of aircraft. Furthermore, the present disclosure is not limited to aircraft applications. For example, in other embodiments, the thermoplastic-thermoset component 16 may alternatively be configured as a structural or non-structural building panel.

The thermoplastic-thermoset component 16 of FIG. 2 includes a multi-layer body 18 and one or more structural supports 20. The multi-layer body 18 may be configured as a flat or contoured sheet of thermoplastic-thermoset material that extends laterally (e.g., axially and/or circumferentially) into and out of the plane of FIG. 2. The multi-layer body 18 has a thickness 22 that extends vertically (e.g., radially) within the plane of FIG. 2 between a first surface 24 and an opposite second surface 26. The first surface 24 may be an interior surface of the multi-layer body 18. The second surface 26 may be an exterior surface (e.g., aerodynamic exterior flow surface) of the multi-layer body 18.

Figure 2B:
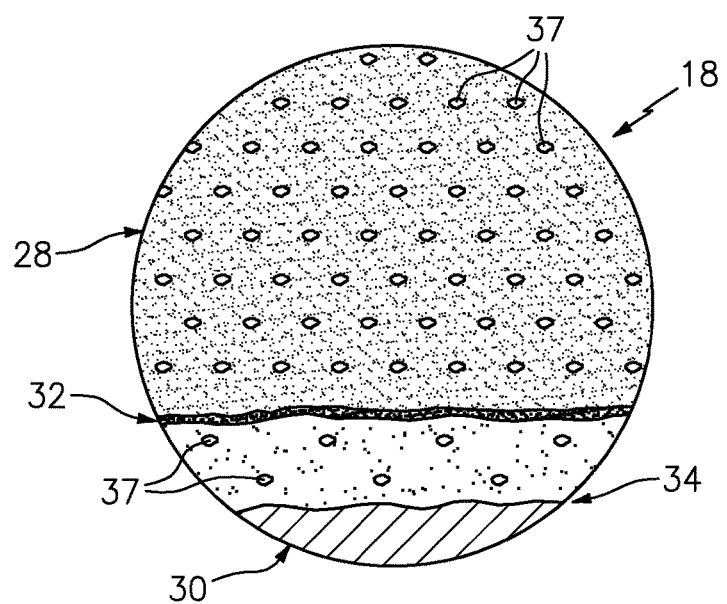
FIG. 2B is an enlarged view of a portion of the thermoplastic-thermoset component of FIG. 2, in accordance with various embodiments.

The multi-layer body 18 of FIG. 2 includes a thermoplastic layer 28, a thermoset layer 30 and a scrim 32 arranged at (e.g., on, adjacent or proximate) an interface 34 between the thermoplastic layer 28 and the thermoset layer 30; see also FIG. 2B. For example, as described below, the scrim 32 of FIGS. 2 and 2B is embedded into the thermoplastic layer 28 adjacent the interface 34 with heated roller for example.

The thermoplastic layer 28 forms the first surface 24, and extends vertically from the first surface 24 to the interface 34 and, thus, the thermoset layer 30. The thermoset layer 30 forms the second surface 26, and extends vertically from the second surface 26 to the interface 34 and, thus, the thermoplastic layer 28. A thickness 36 of the thermoplastic layer 28 may be different (e.g., less or alternatively more) than a thickness 38 of the thermoset layer 30. For example, the thermoplastic layer thickness 36 may be less than or equal to exactly or about (+/−2%) twenty percent (20%) to one-hundred percent (100%) of the thermoset layer thickness 38. In other embodiments, the thermoplastic layer thickness 36 may be greater than two-hundred percent (200%) or 2× of the thermoset layer thickness 38. In still other embodiments, the thermoplastic layer thickness 36 may be greater than or exactly or substantially (+/−2%) equal to the thermoset layer thickness 38.

The thermoplastic layer 28 may at least include (or may only include) a plurality of reinforcement particles 37 within a thermoplastic matrix; e.g., a thermoplastic resin. The thermoplastic matrix may at least include (or may only include) thermoplastic matrix material such as, but not limited to, semi crystalline and/or amorphous thermoplastics such as, for example, polyvinylidene fluoride (PVDF), nylon (e.g., nylon 6112), polyetherimide (PEI), polysulfone (PS) and/or polyethersulfone (PES). These thermoplastics have similar solubility parameters and/or melt temperatures conducive to co-curing with thermosets.

The reinforcement particles 37 may be configured as uniform or non-uniform nano-particles (also known as nanoscale particle) and/or micro-particles (also known as microscale particles). The term "nano-particle" may describe a particle with a maximum and/or minimum size (e.g., diameter) between one and one-hundred nanometers (nm). The term "micro-particle" may describe a particle with a maximum and/or minimum size (e.g., diameter) between one-tenth and one-hundred micrometers (µm).

Each reinforcement particles 37 may at least include (or may only include) thermoplastic particle material such as a high-temperature thermoplastic material. Such thermoplastic particle material may have a melting point that is greater than a melting point of the thermoplastic matrix material. For example, the melting point of the thermoplastic particle material may be greater than or equal to exactly or about (+/−0.5 degrees) 50 degrees Celsius more than of the melting point of the thermoplastic matrix material. With such a melting point differential, the reinforcement particles 37 may be disposed and remain in solid form within a liquid (e.g., melted) form of the thermoplastic matrix during the formation of the multi-layer body 18 as described below in further detail.

An example of the thermoplastic particle material is polyether ether ketone (PEEK). Other examples of the thermoplastic particle material include, but are not limited to, polyether ketone ketone (PEKK), polyphenylene sulfone (PPS) and polyaryletherketone (PAEK).

The thermoplastic layer 28 may include exactly or about (+/−2%) fifty percent by volume of the reinforcement particles 37. The thermoplastic layer 28 may also include exactly or about (+/−2%) fifty percent by volume of the thermoplastic matrix. Of course, in other embodiments, the thermoplastic layer 28 may include more or less than fifty percent by volume of the reinforcement particles 37. In addition or alternatively, the thermoplastic layer 28 may include less or more than fifty percent by volume of the thermoplastic matrix. Furthermore, in some embodiments, the thermoplastic layer 28 may include one or more additional additives/material/reinforcements. For example, the thermoplastic layer 28 may also include a plurality of carbon particles (e.g., carbon nanofibers) to provide additional layer reinforcement. Examples of exemplary carbon particles are disclosed in U.S. Pat. No. 9,511,562, which is hereby incorporated herein by reference in its entirety.

The thermoplastic layer 28 may at least include (or may only include) fiber-reinforcement within a thermoset matrix. The thermoset matrix may at least include (or may only include) thermoset matrix material such as, but not limited to, epoxies, bismaleimides (BMI) and benzoxazine. The fiber-reinforcement may at least include (or may only include) reinforcement fibers arranged in, for example, one or more two-dimensional (e.g., woven or non-woven) sheets and/or three-dimensional (e.g., woven) bodies. Examples of the reinforcement fibers include, but are not limited to, fiber glass fibers, carbon fibers and aramid fibers (e.g., Kevlar®), or some combination thereof.

Figure 3:
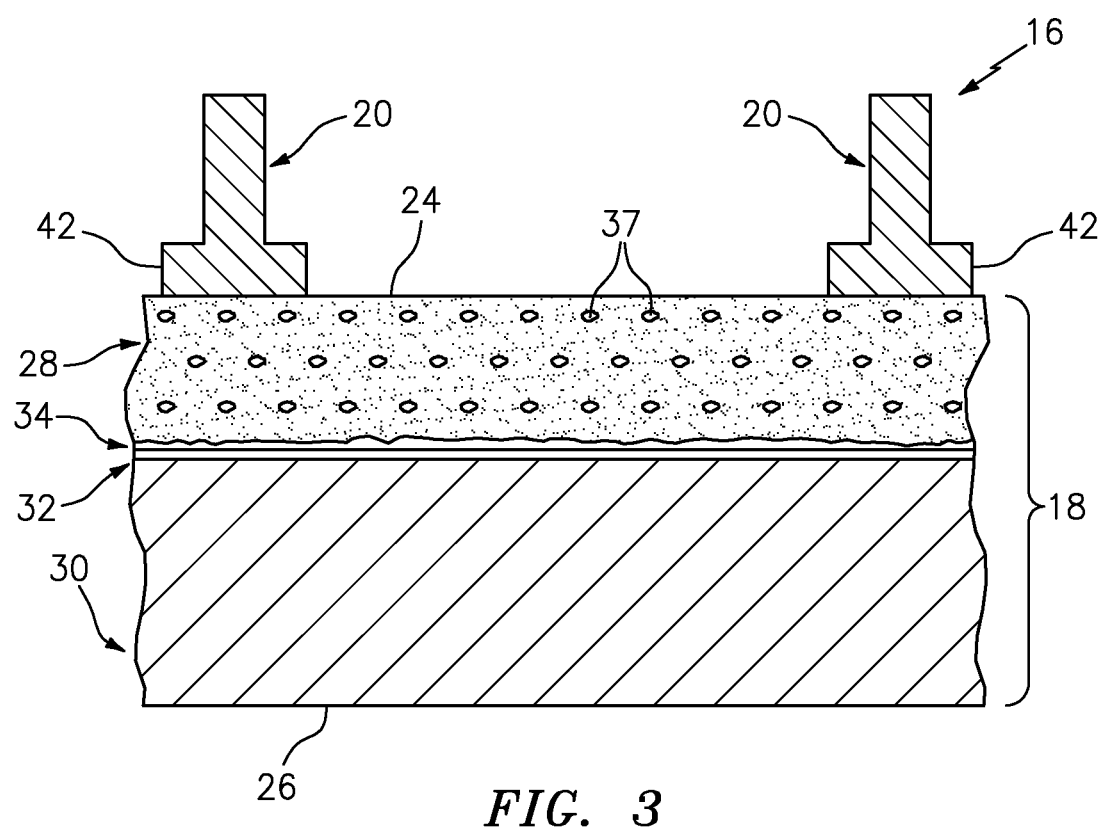
FIG. 3 is a sectional illustration of another thermoplastic-thermoset component, in accordance with various embodiments.

The scrim 32 may be configured as a relatively thin porous sheet of fiber material; e.g., a fiber veil. This scrim 32 may at least include (or only include) woven or non-woven carbon fibers, fiber glass fibers, aramid fibers or some combination of such fibers. The areal weight of the scrim 32 may be exactly or about (+/−2%) fifty percent (50%) or less than the reinforcement areal weight in the thermoset layer 30. In the embodiment of FIG. 2, the scrim 32 is located just adjacent (e.g., bordering and touching) the interface 34 between the thermoplastic layer 28 and the thermoset layer 30, and is included (e.g., embedded) in the thermoplastic layer 28. However, in other embodiments, the scrim 32 may be located just adjacent the interface 34 between the thermoplastic layer 28 and the thermoset layer 30, and included (e.g., embedded) in the thermoset layer 30 as shown in FIG. 3, for example.

Referring again to FIG. 2, at the interface 34, the thermoplastic matrix material interacts (e.g., mixes and interlocks) with the thermoset matrix material. This interaction mechanically entangles and interlocks the thermoplastic layer 28 and the thermoset layer 30 together and with functionalized particles and scrim chemically bonds the layers together. A tie layer may thereby be provided using the scrim 32 at the interface 34 that improves fluid resistance and joining structural properties that can be a problem with the prior disclosed art. The tie layer, for example, may have susceptibility to chemical fluid resistance, and lower melt temperature semi-crystalline thermoplastics may have lower mechanical properties at high temperature.

Each structural support 20 of FIG. 2 may be configured as a (e.g., laterally extending) rib; e.g., a T-beam, an I-beam, a C-channel, etc. However, in other embodiments, one or more of the structural supports 20 may each be configured as another type of support such as, but not limited to, a stiffener, a longeron, a pedestal, a structural (e.g., honeycomb) core, etc. Each structural support is welded, adhered and/or otherwise bonded to the thermoplastic layer 28. For example, a base 42 of each structural support 20 in FIG. 2 is abutted against the first surface 24 of the multi-layer body 18, and bonded to the thermoplastic layer 28 or it may be a hybrid thermoset/thermoplastic. The hybrid thermoset/thermoplastic may be a structure including a thermoplastic overmolded onto a cured thermoset or thermoplastic film that is co-cured with the thermoset.

Each structural support 20 may be a thermoplastic structural support. For example, each structural support 20 may be formed from the same material as the thermoplastic layer 28. Alternatively, one or more of the structural supports 20 may each be formed from thermoplastic material that is different from the material of the thermoplastic layer 28.

Figure 4:
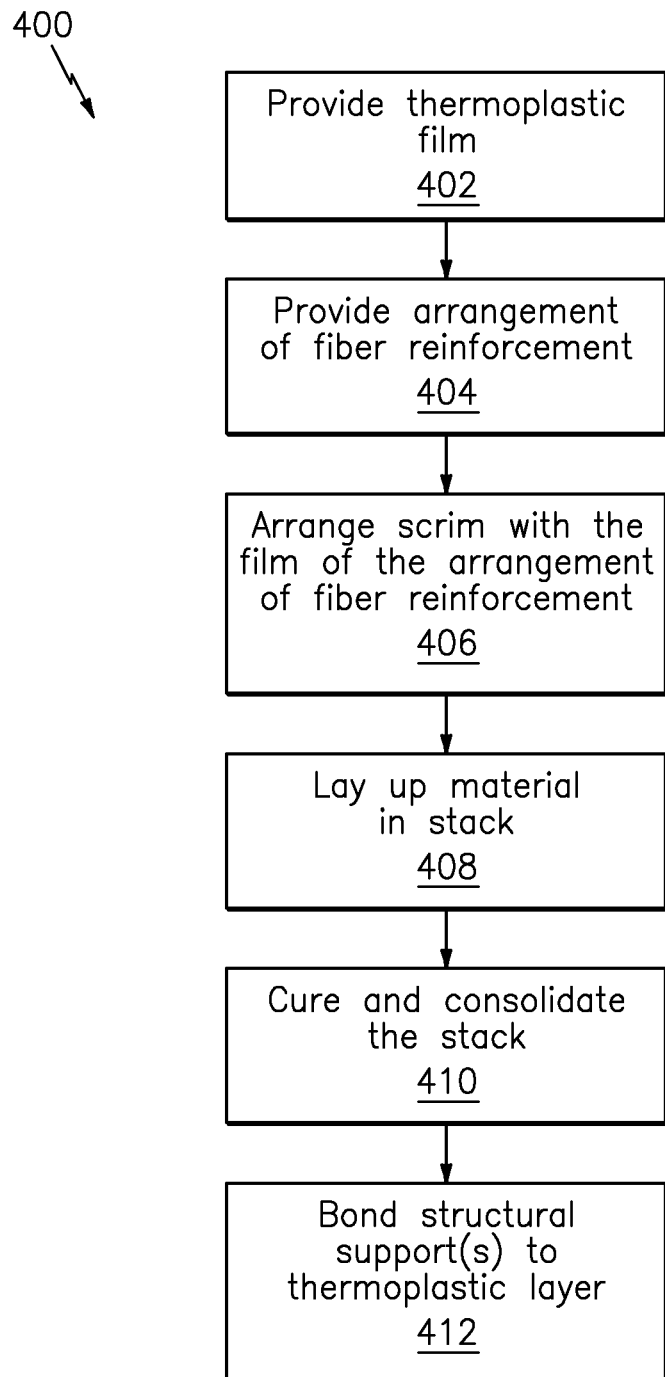
FIG. 4 is a flow diagram of a method 400 for forming a component, in accordance with various embodiments.
Figure 5:
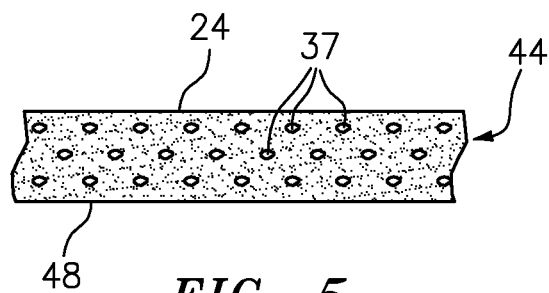
FIG. 5 is a sectional illustration of a thermoplastic film, in accordance with various embodiments.

FIG. 4 is a flow diagram of a method 400 for forming a component such as the thermoplastic-thermoset component 16 of FIGS. 2 and 3. In step 402, a thermoplastic film 44 is provided as shown, for example, in FIG. 5. This thermoplastic film 44 may include one or more or all of the components in the thermoplastic layer 28. For example, the thermoplastic film 44 may include the reinforcement particles 37 as well as the carbon particles and/or other additional additives/material/reinforcements. As the film is being formed, the thermoplastic matrix may be melted into a liquid form. The other particles, which are in solid form, may then be added and mixed (e.g., shear mixed) into the melted thermoplastic matrix. This mixture may then be cooled to provide the thermoplastic film 44.

In step 404, an arrangement 46 of the fiber reinforcement for the thermoset layer 30 is provided. This arrangement 46 of the fiber reinforcement may include one or more stacked sheets of the fiber reinforcement, which may be pre-impregnated with the thermoset matrix. Thus, the arrangement 46 of the fiber reinforcement may include one or more stacked sheets of prepreg material, which include the fiber reinforcement and the thermoset matrix.

Figure 6:
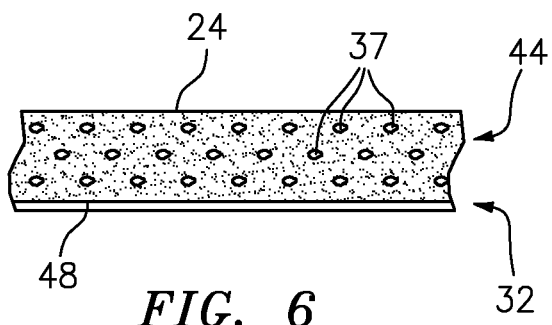
FIG. 6 is a sectional illustration of a scrim configured with the thermoplastic film, in accordance with various embodiments.
Figure 7:
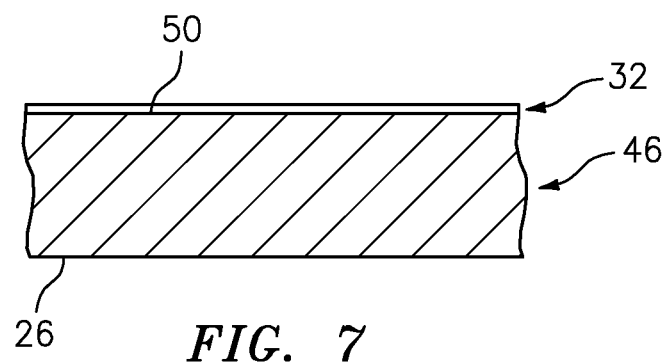
FIG. 7 is a sectional illustration of a scrim configured with an arrangement of fiber reinforcement, in accordance with various embodiments.
Figure 8:
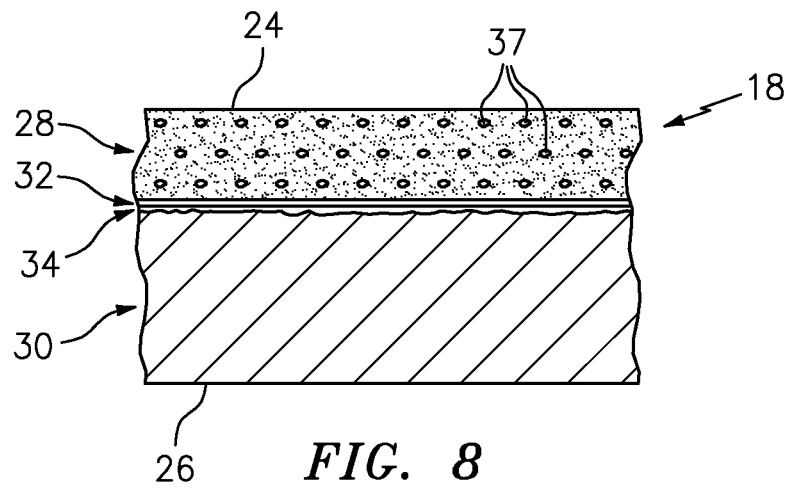
FIG. 8 is a sectional illustration of a multi-layer body included in the thermoplastic-thermoset component of FIG. 2, in accordance with various embodiments.
Figure 9:
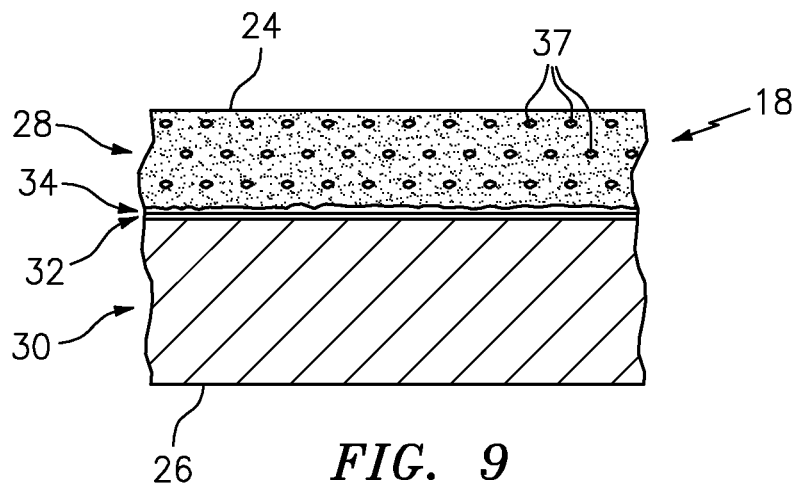
FIG. 9 is a sectional illustration of a multi-layer body included in the thermoplastic-thermoset component of FIG. 3, in accordance with various embodiments.

In step 406, the scrim 32 is arranged with either the thermoplastic film 44 (see FIGS. 2, 6 and 8) or the arrangement 46 of the fiber reinforcement for the thermoset layer 30 (see FIGS. 3, 7 and 9). For example, the scrim 32 may be tacked onto an interior surface 48 of the thermoplastic film 44 as shown in FIG. 6. In another example, the scrim 32 may be at least partially impregnated with the thermoplastic matrix and laid against and thereby bonded to the interior surface 48. In still another example, the scrim 32 may be similarly tacked or otherwise bonded onto an interior surface 50 of the arrangement 46 of the fiber reinforcement as shown in FIG. 7.

In step 408, the material is laid up in a stack with the scrim 32 between the thermoplastic film 44 and the arrangement 46 of the fiber reinforcement. In step 410, the stack of material is cured and consolidated together, for example, in an autoclave or with out of the autoclave (OOA) processing to provide a multi-layered body as shown in FIGS. 8 and 9. During this curing, the thermoplastic matrix and the thermoset matrix liquefy/melt. The melted thermoplastic material is thereby operable to migrate through pores of the scrim 32 and interface with the liquid thermoset material. The scrim 32, however, may serve to substantially or completely prevent migration of the reinforcement particles 37 out of the thermoplastic layer 28. Thus, the reinforcement particles 37 within the thermoplastic matrix of the thermoplastic film 44 substantially remain within the formed thermoplastic layer 28; e.g., above the scrim 32 in the figures. Some of the additional particles (e.g., the carbon particles), however, may migrate through the scrim 32 and strengthen the bonded interface between the thermoplastic layer 28 and the thermoset layer 30 as illustrated in FIG. 2B. However, a density of the particles 37 above the scrim 32 of FIG. 2B may significantly (e.g., 5-10×) greater than a density of the particles 37 below the scrim 32.

In step 412, the one or more structural supports 20 are bonded to the thermoplastic layer 28 to provide components as illustrated in FIGS. 2 and 3, for example.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for forming a component, the method comprising:
   providing a thermoplastic layer comprising a plurality of reinforcement particles within an amorphous thermoplastic matrix;
   providing a thermoset layer comprising fiber-reinforcement within a thermoset matrix;
   providing a scrim;
   bonding the thermoplastic layer, the thermoset layer and the scrim together to form a multi-layer body, the scrim disposed at an interface between the thermoplastic layer and the thermoset layer; and
   bonding a structural support to the thermoplastic layer, the structural support structurally reinforcing the multi-layer body, and the thermoset layer forming an exterior flow surface of the component.

2. The method of claim 1, wherein the component is an aircraft component.

3. The method of claim 1, wherein the amorphous thermoplastic matrix comprises polyvinylidene fluoride.

4. The method of claim 1, wherein the amorphous thermoplastic matrix comprises nylon.

5. The method of claim 1, wherein the multi-layer body comprises a skin that is supported by the thermoplastic structural support.

6. The method of claim 1, wherein
   the plurality of reinforcement particles comprise a plurality of thermoplastic particles; and
   a melting point of the amorphous thermoplastic matrix is less than a melting point of the plurality of thermoplastic particles.

7. The method of claim 1, wherein the plurality of reinforcement particles comprise a plurality of polyether ether ketone particles.

8. The method of claim 1, wherein the thermoplastic layer comprises about fifty percent by volume of the plurality of reinforcement particles and about fifty percent by volume of the amorphous thermoplastic matrix.

9. The method of claim 1, wherein the plurality of reinforcement particles comprise a plurality of nano-particles.

10. The method of claim 1, wherein the plurality of reinforcement particles comprise a plurality of micro-particles.

11. The method of claim 1, wherein the thermoplastic layer further includes a plurality of carbon particles.

12. The method of claim 1, wherein the scrim comprises at least one of carbon fibers or glass fibers.

13. The method of claim 1, wherein the scrim is impregnated with the amorphous thermoplastic matrix.

14. The method of claim 1, wherein the scrim is impregnated with the thermoset matrix.

15. The method of claim 1, wherein the thermoplastic matrix mixes with the thermoset matrix at the interface.

* * * * *